United States Patent
Arpert

(10) Patent No.: US 7,370,621 B2
(45) Date of Patent: May 13, 2008

(54) INTAKE MANIFOLD WITH AIR VESSEL FOR AN INTERNAL COMBUSTION ENGINE

(75) Inventor: Klaus Peter Arpert, Rötgesbüttel (DE)

(73) Assignee: Magneti Marelli Powertrain S.p.A., Borletti (IT)

( * ) Notice: Subject to any disclaimer, the term of this patent is extended or adjusted under 35 U.S.C. 154(b) by 153 days.

(21) Appl. No.: 11/236,867

(22) Filed: Sep. 28, 2005

(65) Prior Publication Data

US 2006/0065226 A1 Mar. 30, 2006

(30) Foreign Application Priority Data

Sep. 28, 2004 (EP) .................................. 04425722

(51) Int. Cl.
*F02M 35/00* (2006.01)

(52) U.S. Cl. ............................. 123/184.53; 123/184.54

(58) Field of Classification Search ........... 123/184.54, 123/184.51, 184.53, 184.57, 184.21

See application file for complete search history.

(56) References Cited

U.S. PATENT DOCUMENTS

| | | | |
|---|---|---|---|
| 4,928,639 A * | 5/1990 | Schatz ................... | 123/184.54 |
| 5,009,199 A * | 4/1991 | MacFarlane ............ | 123/184.54 |
| 5,038,734 A * | 8/1991 | Schatz .................. | 123/403 |
| 5,377,629 A | 1/1995 | Brackett et al. | |
| 5,660,155 A * | 8/1997 | Taue et al. ............ | 123/184.54 |
| 5,826,554 A | 10/1998 | Kühnel et al. | |
| 6,302,076 B1 | 10/2001 | Bredy | |
| 6,886,517 B2 * | 5/2005 | Linhart et al. ......... | 123/184.53 |

FOREIGN PATENT DOCUMENTS

| | | |
|---|---|---|
| DE | 32 10 239 | 10/1983 |
| DE | 102 17 760 | 11/2003 |

* cited by examiner

*Primary Examiner*—Marguerite McMahon
(74) *Attorney, Agent, or Firm*—Venable LLP; Robert Kinberg; Steven J. Schwarz

(57) ABSTRACT

An intake manifold for an internal combustion engine having a number of cylinders; for each cylinder, the intake manifold has a respective intake pipe connecting the intake manifold to the cylinder and regulated by an intake valve; and the intake manifold also has an air vessel having, for each intake pipe, a respective hollow body defining an empty chamber, which communicates with the intake pipe by means of a high-speed compensation valve.

15 Claims, 2 Drawing Sheets

INTAKE MANIFOLD WITH AIR VESSEL FOR AN INTERNAL COMBUSTION ENGINE

CROSS-REFERENCE TO RELATED APPLICATION

This application claims the priority of European Patent Application No. 04425722.8 filed Sep. 28, 2004, the subject matter of which is incorporated herein by reference.

BACKGROUND OF THE INVENTION

The present invention relates to an intake manifold for an internal combustion engine.

As is known, an internal combustion engine comprises a number of cylinders, each connected to an intake manifold by means of a respective intake valve, and to an exhaust manifold by means of a respective exhaust valve. The intake manifold is connected to each cylinder by a respective intake pipe, and receives fresh air (i.e. outside air containing approximately 20% oxygen) by means of a throttle valve adjustable between a closed position and a fully-open position; and an exhaust pipe extends from the exhaust manifold, and terminates in a silencer to discharge the combustion gases into the atmosphere.

Cyclic opening and closing of the intake valves prevents continuous mass flow of the intake air, and pulsation or even return flow inside the intake pipes occurs. This discontinuous flow impairs charging of the cylinders (and therefore engine torque) and subjects the intake manifold to mechanical stress which prevents the manufacture of lighter-construction intake manifolds.

DE-3210239-A1 describes an air vessel for compensating flow rate fluctuations in pressure lines of pumps and the like (especially oscillating positive displacement pumps); the air vessel has a tubular membrane through which the flow medium flows; a reservoir fluid surrounding the tubular membrane in a housing containing the tubular membrane; a feeler valve located on the outer face of the tubular membrane, in the reservoir fluid; and a pressure vessel containing the reservoir fluid. In this air vessel design, the flow medium flows through the vessel in a straight line; and the tubular membrane is preferably a double tube to prevent the flow medium coming into contact with the reservoir fluid of the pressure vessel.

U.S. Pat. No. 5,826,554 describes pressure relief means for a thin-wall air intake pipe for an internal combustion engine; a valve is installed in an opening in a thin wall of an air intake pipe, which supplies combustion air from a flow control device to an internal combustion engine cylinder, to relieve excess pressure in the pipe. The valve includes a socket connected to a segment of the air intake pipe, and an elastomer, umbrella valve member is supported in the socket to normally cover the opening in the pipe, and to undergo deformation, when the pressure in the pipe reaches a predetermined value, so as to uncover the opening and connect the interior of the pipe to the ambient atmosphere.

SUMMARY OF THE INVENTION

It is an object of the present invention is to provide an internal combustion engine intake manifold designed to eliminate the aforementioned drawbacks, and which in particular is cheap and easy to produce.

According to the present invention there is provided an intake manifold for an internal combustion engine, as claimed in the attached Claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
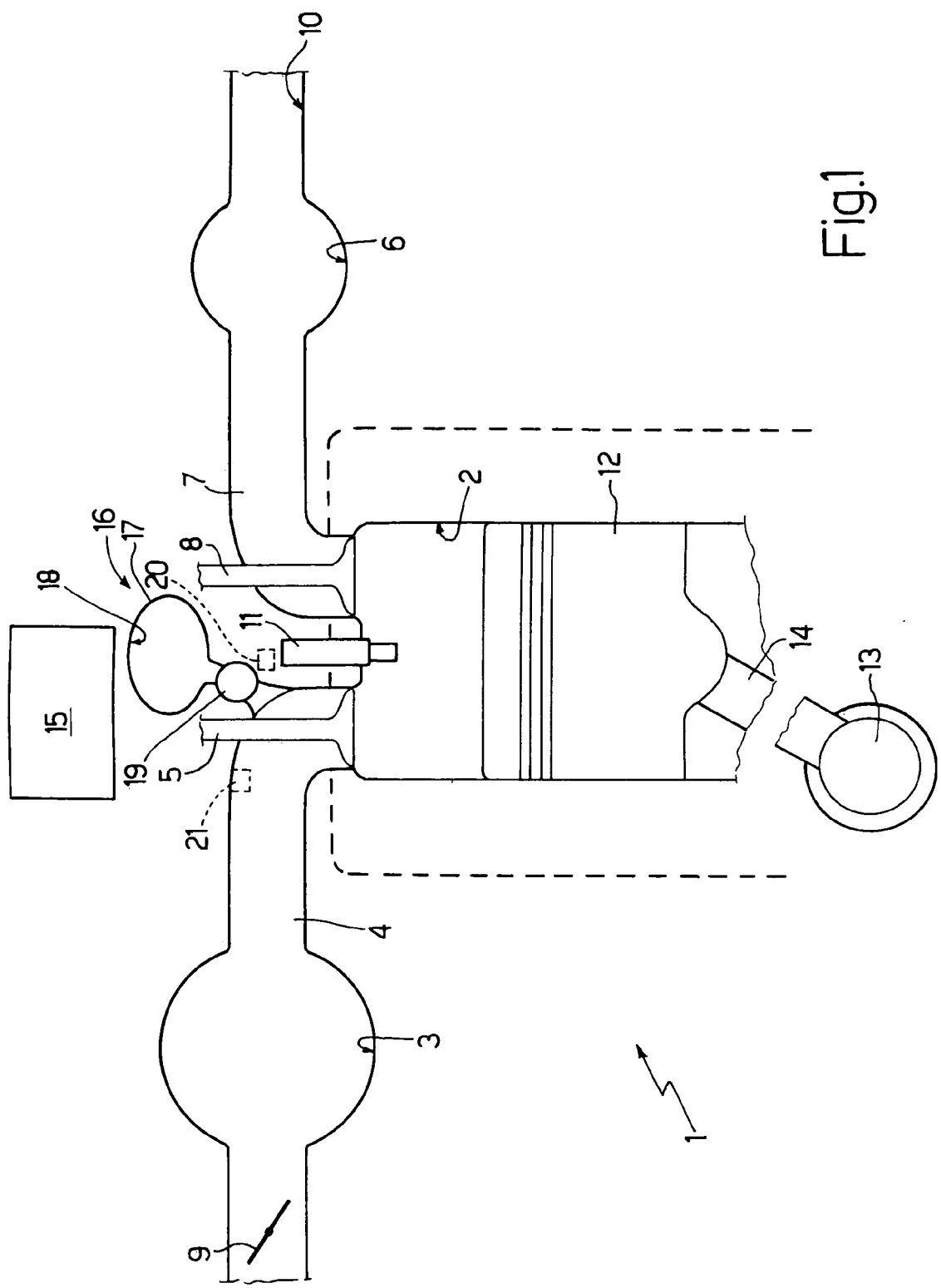
FIG. 1 shows a schematic view of an internal combustion engine having an intake manifold in accordance with the present invention.

Number 1 in FIG. 1 indicates as a whole an internal combustion engine having four cylinders 2 (only one shown in FIG. 1), each connected to an intake manifold 3 by a respective intake pipe 4 regulated by an intake valve 5, and to an exhaust manifold 6 by a respective exhaust pipe 7 regulated by an exhaust valve 8. The intake manifold 3 receives fresh air (i.e. outside air containing approximately 20% oxygen), by means of a throttle valve 9 adjustable between a closed position and a fully-open position. An exhaust pipe 10 extends from exhaust manifold 6, and terminates in a known silencer (not shown) to discharge the combustion gases into the atmosphere.

In a first embodiment shown in FIG. 1, the fuel (e.g. petrol, diesel, methane, LPG, etc.) is injected directly into each cylinder 2 by a respective injector 11; in an alternative embodiment not shown, injectors 11 are located inside intake pipes 4 (indirect injection).

Each cylinder 2 has a piston 12, which moves cyclically up and down inside cylinder 2 and is connected mechanically to a crankshaft 13 by a relative crank 14.

Engine 1 also comprises a control unit 15 which, in particular, controls throttle valve 9 and injectors 11 at each cycle to fill cylinders 2 with a quantity of fuel-combustion supporter (fresh air) mixture depending on the operating conditions of engine 1 and control by the driver. Intake valves 5 and exhaust valves 8, on the other hand, are connected mechanically to crankshaft 13 by a cam system (not shown) and so activated by rotation of crankshaft 13.

Intake manifold 3 comprises an air vessel 16 which, for each intake pipe 4, comprises a hollow body 17 located between intake manifold 3 and cylinder 2, and defining an empty chamber 18, which communicates with intake pipe 4 by means of a high-speed compensation valve 19 located in front of the cylinder intake defined by intake valve 5. In a variation not shown, a single hollow body 17 is provided between intake manifold 3 and cylinders 2, and contains four mutually isolated empty chambers 18 (i.e. for each cylinder 2 there is a relevant isolated empty chamber 18).

In an alternative embodiment (not shown), air vessel 16 comprises only one hollow body 17, which communicates with the four intake pipes 4 by means of four respective compensation valves 19. In a further embodiment not shown, air vessel 16 comprises only one hollow body 17, which communicates with intake manifold 3 by means of a single compensation valve 19. This configuration is cheaper and more compact, but reduces performance.

In the embodiment shown, each compensation valve 19 is powered by a known cam (not shown) connected to crankshaft 13, and which may either be the same cam powering relative intake valve 5, or a different cam. In an alternative embodiment shown by the dash line, each compensation valve 19 is powered by a respective electric actuator 20 controlled by control unit 15; in which case, control unit 15 may also be connected to a number of pressure sensors 21, each housed, and for determining the pressure, inside a respective intake pipe 4. Without pressure sensors 21, opening/closing of compensation valves 19 is performed solely on the basis of the angular position of crankshaft 13; with pressure sensors 21, opening/closing of compensation valves 19 is performed on the basis of the angular position of crankshaft 13 and the value of the pressure inside intake pipes 4. The pressure sensors 21 could be substituted by an estimating unit, which is able to estimate the value of the pressure inside the intake pipes 4 without performing a direct measure.

In actual use, cyclic opening and closing of intake valves 5 prevents continuous mass flow of the intake air, and causes pulsation inside intake pipes 4; which pulsation of the intake air causes underpressure and overpressure inside each intake pipe 4, and the variation in pressure is time-dependent (i.e. depends on the angular position of crankshaft 13).

Figure 2:
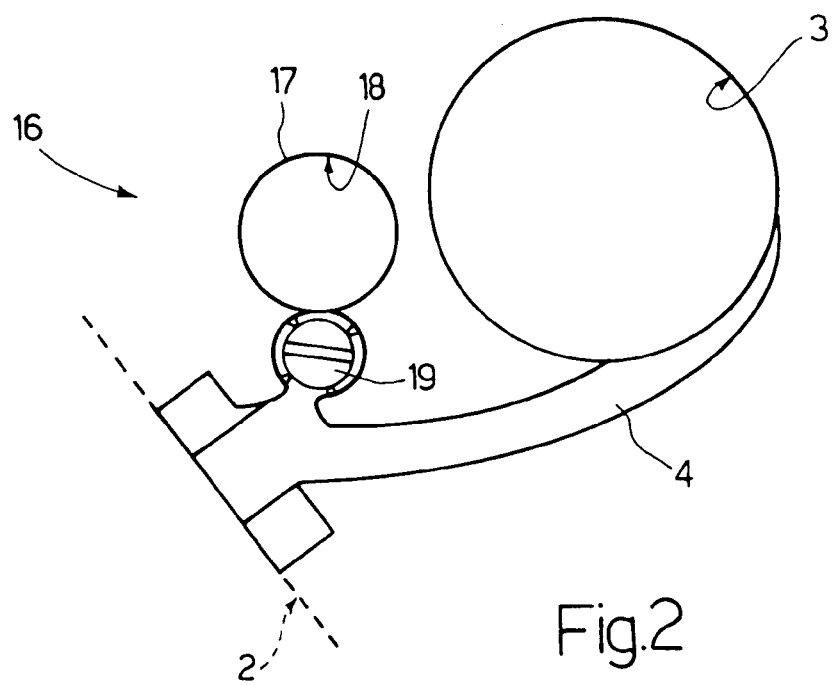
FIGS. 2 and 3 show schematic lateral sections of an air vessel of the FIG. 1 intake manifold in two different configurations.
Figure 3:
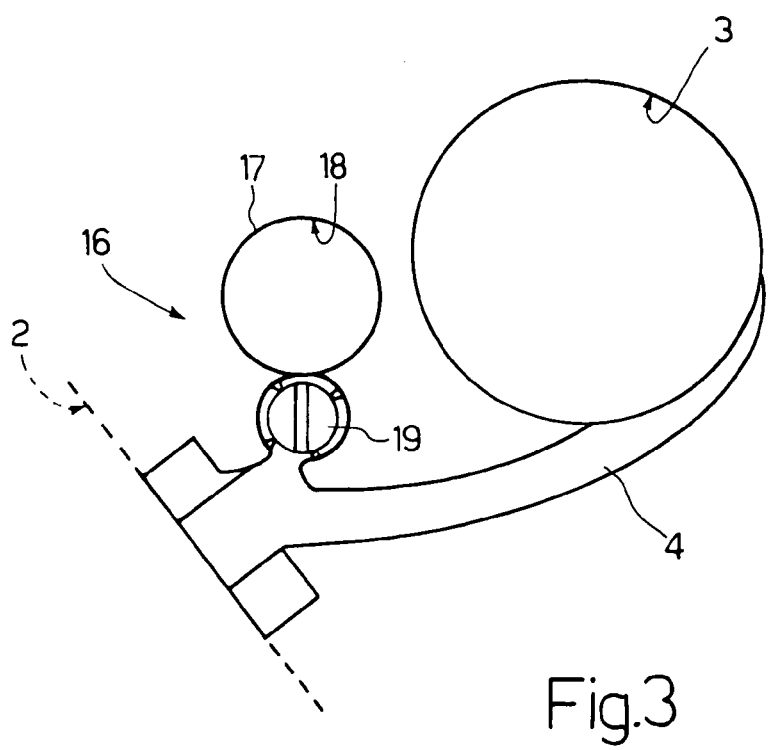

During the intake stroke of a cylinder 2 (i.e. when relative intake valve 5 is open to feed fresh air from intake manifold 3 into cylinder 2), respective compensation valve 19 is closed (FIG. 2); as soon as intake valve 5 closes and the pressure inside relative intake pipe 4 starts to rise, respective compensation valve 19 is opened (FIG. 3) until the pressure reaches maximum, and is then closed immediately to establish an overpressure in chamber 18. When intake valve 5 is re-opened at the start of the next intake stroke of cylinder 2, compensation valve 19 is opened to support charging of cylinder 2. More specifically, compensation valve 19 may be opened shortly before opening intake valve 5, so as to generate a small overpressure inside intake pipe 4 when intake valve 5 is opened. When an underpressure is produced in intake pipe 4 by suction of cylinder 2, compensation valve 19 is closed to produce an underpressure in chamber 18; at which point, the above cycle is repeated.

The above disclosed air vessel 16 may be used in any kind of internal combustion engine including two-strokes engines or rotating engines, which do not have intake and exhaust valves, and also racing engines, which have an intake manifold for each cylinder.

Air vessel 16 provides for greatly reducing the negative effects produced by pulsation of the intake air, and in particular for improving charge of the cylinders (and therefore engine torque) and for reducing mechanical stress on intake manifold 3.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An intake manifold for an internal combustion engine having at least one cylinder; the intake manifold comprising:
    at least one intake pipe connecting the intake manifold to the cylinder; and
    an air vessel comprising at least one hollow body defining an empty chamber, which communicates directly with the intake manifold by means of a high-speed compensation valve; and
    actuating means controlling opening/closing of the compensation valve on the basis of the angular position of a crankshaft of the engine to open the compensation valve at the start of each intake stroke of the cylinder.

2. An intake manifold as claimed in claim 1, wherein the hollow body is located between the intake manifold and the cylinder.

3. An intake manifold as claimed in claim 1, wherein the intake pipe is regulated by at least one intake valve and the compensation valve is located in front of the cylinder intake defined by the intake valve.

4. An intake manifold as claimed in claim 1, wherein the compensation valve is actuated by a cam system powered by a crankshaft of the engine.

5. An intake manifold as claimed in claim 4, wherein the intake pipe is regulated by at least one intake valve and the compensation valve is actuated by the cam powering the intake valve.

6. An intake manifold as claimed in claim 1, wherein the compensation valve is actuated by an electric actuator controlled by a control unit.

7. An intake manifold as claimed in claim 6, wherein estimating means are provided, are connected to the control unit, and estimate the pressure inside the intake pipe; and the control unit controls opening/closing of the compensation valve on the basis of the angular position of a crankshaft of the engine, and of the value of the pressure inside the intake pipe.

8. An intake manifold as claimed in claim 7, wherein the estimating means comprise a pressure sensor located inside the intake pipe.

9. An intake manifold as claimed in claim 1, wherein the engine comprises a number of cylinders, each connected to the intake manifold by a relative intake pipe; and the air vessel comprises only one hollow body, which communicates with the intake manifold by means of a single compensation valve.

10. An intake manifold as claimed in claim 1, wherein the engine comprises a number of cylinders, each connected to the intake manifold by a relative intake pipe; and the air vessel comprises only one hollow body, which communicates with each intake pipe by means of a compensation valve.

11. An intake manifold as claimed in claim 1, wherein the engine comprises a number of cylinders, each connected to the intake manifold by a relative intake pipe; and the air vessel comprises, for each intake pipe, a relative empty chamber connected to the intake pipe by a respective compensation valve.

12. An intake manifold as claimed in claim 11, wherein the air vessel comprises a single hollow body, which contains a number of mutually isolated empty chambers.

13. An intake manifold as claimed in claim 1, wherein the intake pipe is regulated by at least one intake valve.

14. An intake manifold as claimed in claim 13, wherein the empty chamber communicates directly with the intake pipe by means of the high-speed compensation valve; at the end of the intake stroke of the cylinder, the compensation valve is closed; as soon as the intake valve closes and the pressure inside the intake pipe starts to rise, the compensation valve is opened until the pressure-reaches maximum, and is then closed immediately to establish an overpressure in the chamber; when the intake valve is re-opened at the start of the next intake stroke of the cylinder, the compensation valve is opened to support charging of the cylinder; and, when an underpressure is produced in the intake pipe by suction of the cylinder, the compensation valve is closed to produce an underpressure in the chamber.

15. An intake manifold as claimed in claim 14, wherein the compensation valve is opened shortly before opening the intake valve, so as to generate a small overpressure inside the intake pipe when the intake valve is opened.

* * * * *

UNITED STATES PATENT AND TRADEMARK OFFICE
CERTIFICATE OF CORRECTION

PATENT NO. : 7,370,621 B2 Page 1 of 1
APPLICATION NO. : 11/236867
DATED : May 13, 2008
INVENTOR(S) : Klaus Peter Arpert It is certified that error appears in the above-identified patent and that said Letters Patent is hereby corrected as shown below:

Title Page item 73 Assignee

Change from Borletti, Italy to -- Corbetta, Italy --

Signed and Sealed this

Twenty-sixth Day of August, 2008

JON W. DUDAS
*Director of the United States Patent and Trademark Office*